United States Patent [15] 3,668,171
Sims [45] June 6, 1972

[54] NYLON COMPOSITIONS CONTAINING DIISOCYANATE MOLD RELEASE AGENTS

[72] Inventor: Willard M. Sims, Leominster, Mass.

[73] Assignee: Foster Grant Co., Inc., Leominster, Mass.

[22] Filed: Jan. 11, 1971

[21] Appl. No.: 105,635

[52] U.S. Cl. .........................................260/32.4 R, 260/453
[51] Int. Cl. ..........................................................C08g 51/44
[58] Field of Search..............................260/32.4 R, 453 AL

[56] References Cited

UNITED STATES PATENTS 2,723,265  11/1965  Blallmann..............................260/329
2,865,940  12/1958  Nobis.....................................260/453
3,040,002  1/1962  Aldridge................................260/77.5

Primary Examiner—Morris Liebman
Assistant Examiner—Richard Zarlen
Attorney—Leroy G. Sinn, Coleman R. Reap and Leonard S. Selman

[57] ABSTRACT

The mold release properties of nylon compositions are significantly improved by incorporating about 0.01 to 5.0 parts per 100 parts of nylon of a hydrocarbon diisocyanate having about 25 to 50 carbon atoms in the hydrocarbon chain.

7 Claims, No Drawings

NYLON COMPOSITIONS CONTAINING DIISOCYANATE MOLD RELEASE AGENTS

BACKGROUND OF THE INVENTION

This invention concerns nylon compositions and more particularly nylon compositions having improved adhesion resistance.

Thermoplastic materials, such as nylon are widely used in fabricating articles by molding techniques. In commercial molding processes molten polymer is extruded or ram injected into a mold maintained at a temperature considerably below the melting point of the polymer by cooling means. When the molten polymer enters the mold it is quickly cooled to a temperature at which it solidifies and hardens. As the molten polymer solidifies it shrinks somewhat so that the hardened article fits more loosely in the mold and upon opening the mold it falls out or it can be easily mechanically ejected from the mold. Because of this, articles molded from thermoplastic materials can be easily mass produced.

Due to the low shrinkability of nylon relative to other thermoplastic polymers, articles molded from nylon have a tendency to stick to the inside of the mold, thus making it more difficult to produce nylon molded articles on a rapid molding cycle. This problem is compounded when the undercut surfaces of the mold have sharp angles or when the interior face of the mold has an intricate configuration. In these cases the articles must often be removed from the molds by hand. It has been observed that the problem of mold releasability is particularly acute when polycaprolactam is molded into intricately shaped articles. This is apparently due to the fact that polycaprolactam shrinks to a less degree than other nylon materials. Nylon 6,6 poly(hexamethylene adipate) which shrinks a considerably greater amount than polycaprolactam presents less of a problem when fabricating articles in molds having sharp undercut angles because upon cooling it fits loosely in the mold. But in spite of this, even articles molded from nylon 6,6 have a slight tendency to stick to the mold surfaces.

The tacky nature of nylon also presents a problem in film forming applications. In making nylon films molten nylon is cast upon a cooled roller, usually by means of an extruder. The thin nylon film solidifies immediately upon contact with the roller but has a tendency to stick to the roller, often causing the nylon film to wrinkle or tear.

In the past these problems have been somewhat overcome by the use of a combination of internal and external lubricants. Typical internal lubricants are metallic soaps, fatty alcohols and silicones. These are usually blended into the polymeric composition. In addition to these the metallic surfaces of the molds and rollers are frequently dusted during operation with lubricating materials such as sodium or potassium stearate. Combinations of such external and internal lubricants as the above considerably improve the moldability of nylon but they do not completely solve the problems of mold release, particularly when molding articles of intricate shapes from polycaprolactam in molds having sharply undercut angles.

Nylon molding compositions have now been discovered which have greatly improved molding and sheet casting properties. Articles molded from these compositions drop easily from the mold even if the mold has an intricate configuration or sharp undercut angles. In addition, when the compositions of the invention are heated to the molten state and cast onto cooled rollers to make nylon film the molten nylon has very little tendency, if any, to stick to the rollers.

Accordingly, it is an object of the present invention to present nylon compositions having improved adhesion resistance. It is another object of the invention to present nylon compositions which have improved molding properties. It is a third object to present a method of preparing nylon compositions having improved adhesion resistance and molding properties. These and other objects of the invention will become more apparent as the description proceeds.

SUMMARY OF THE INVENTION

According to the invention nylon compositions having improved adhesion resistance are prepared by incorporating one or more hydrocarbon diisocyantes into the nylon compositions. The hydrocarbon to which is attached the isocyanate radicals is selected from the group consisting of saturated aliphatic and alicyclic radicals containing about 25 to 50 and preferably 30 to 40 carbon atoms. The hydrocarbon diisocyanate is present in an amount of about 0.01 to 5.0 and preferably about 0.10 to 2.0 parts per 100 parts of nylon in the composition. It can be blended with the nylon at any time subsequently to polymerization.

DESCRIPTION OF THE INVENTION

The term nylon is used in its usual sense and includes all long chain polyamides having recurring amide groups as an integral part of the main polymer chain. Typical of the polyamides contemplated are those prepared by condensation of amino acids or amino acid anhydrides, such as aminocaproic acid or epsilon- caprolactam, and products of the condensation reaction between diamines and dicarboxylic acids, such as hexamethylene diamine and adipic acid. Mixtures of two or more different nylons can also be used in the preparation of the products of the invention. As noted above, the invention is particularly beneficial for improving the properties of polycaprolactam.

The term adhesion resistance is defined in the present discussion as the ability of thermoplastic materials to resist sticking to the surfaces of solid materials. These materials include, among others, metals, glass, wood, and other solid polymeric materials.

The hydrocarbon diisocyanates which can be used in the present invention are the saturated aliphatic and alicyclic diisocyanates having 25 to 50 carbon atoms in the aliphatic hydrocarbon portion of the compound. The saturated aliphatic carbon compounds which are attached to the diisocyanates include linear and branched chain hydrocarbons of the paraffin series. The term alicyclic carbon compounds means saturated carbocyclic compounds containing one or more rings and one or more saturated aliphatic side chains may be attached to the ring carbon atoms. The number of carbon atoms present in the hydrocarbon portion of the diisocyanate compounds may vary from about 25 to 50 with the preferred range being about 30 to 50. These are two isocyanate groups attached to each molecule. Examples of typical hydrocarbon diisocyanates useable in the invention are 1, 36-diisocyanato-hexatriacontane, 1,20-diisocyanato-10-hexyl-eicosane, and 1,4-diisocyanatodecyl- cyclohexane. Mixtures of diisocyanates may also be used in preparing the compositions of the invention.

The hydrocarbon diisocyanate is preferably used in amounts of about 0.01 to about 5.0 percent based on the weight of nylon in the composition. Nylon compositions containing more than or less than these percentages are useful for some applications, but it has been observed that compositions containing at least 0.01 percent hydrocarbon diisocyanate based on the weight of nylon in the composition have the best adhesion resistance. On the other hand, the benefit realized diminishes rapidly as the concentration increases beyond about 5 percent and it becomes economically unfeasible to use amounts greatly in excess of this concentration. In general, less hydrocarbon diisocyanate is needed to produce satisfactory results when the nylon composition is to be used for film forming than when it is to be used for molding. The preferred range is about 0.10 to about 2.0 percent, based on the weight of nylon in the composition.

The hydrocarbon diisocyanates used in the invention have been found to have excellent lubricating properties in nylon compositions even in applications in which proper lubrication is difficult. For example, as mentioned above, polycaprolactam is a somewhat difficult nylon to adapt to rapid molding cycles, particularly when the mold has sharp undercut angles or when the article being molded has an intricate shape. This has presented such a problem that many molders will not use polycaprolactam to mold articles that have intricate shapes but, instead, will use some other nylon, such as nylon 6,6, which, because of its greater shrinkability, does not generally cause the above problem. Now, by virtue of the present invention, molders can use polycaprolactam without being so concerned about the molded article sticking to the faces of the mold.

The nylon compositions of the invention are prepared by blending the hydrocarbon diisocyanates with the nylon subsequently to polymerization. This can be accomplished by any desired method, such as by blending the hydrocarbon diisocyanates with the nylon after it has been cooled and comminuted or by injecting it into the molten nylon as it leaves the reactor. In addition, it is sometimes desirable to extrude the mixture to obtain a more uniform dispersion of the hydrocarbon diisocyanate in the nylon composition; however, this step is not usually necessary when producing general purpose nylon composition.

The invention may be practiced on a mixture of nylon materials if so desired. Thus, the hydrocarbon isocyanates disclosed may be used to lubricate a composition comprised of a mixture of polycaprolactam and poly(hexamethylene adipamide) if so desired. Other materials may also be incorporated into the compositions of the invention provided they are compatible with nylon. Thus, other polymeric substances such as fluorinated hydrocarbon polymers may be included in the compositions of the invention. Similarly, filler material such as graphite may be added to the nylon compositions. Other additives such as antioxidants, dyes and plasticizers may also, of course, be included in the compositions of the invention. It is also contemplated that external lubricants may be used in molding the compositions of the invention, if so desired.

The following examples will better illustrate the invention. Parts and percentages are on a weight basis.

EXAMPLE I

One hundred parts of polycaprolactam pellets was tumbled with 0.25 part of a hydrocarbon diisocyanate (sold under the trademark *ddi* having the formula

$$O = C = N[R]N = C = O$$

where R is a 36-carbon hydrocarbon radical) until the hydrocarbon diisocyanate was uniform coated on the surfaces of the polycaprolactam pellets. The mixture was then extruded and pelletized.

Test articles having an intricate shape were molded in a laboratory injection molding machine from the hydrocarbon diisocyanate-coated polycaprolactam pellets. The mold surfaces were dusted lightly with sodium stearate. These articles fell easily from the mold.

In contrast to this when articles were molded in the same mold from polycaprolactam which contained no hydrocarbon diisocyanate, the molded articles had to be removed from the mold by hand.

This example demonstrates that the mold release properties of polycaprolactam compositions are improved by incorporating a small amount of hydrocarbon diisocyanate into the polycaprolactam.

EXAMPLE II

A portion of the diisocyanate-coated polycaprolactam pellets prepared in Example I was extruded onto cooled film-casting rolls which fed onto a take-up roll. The film exhibited no tendency to adhere to the surfaces of the rolls.

In contrast to this when polycaprolactam containing no hydrocarbon diisocyanate was extruded onto the same rolls it tended to adhere to the surfaces of the rolls and the resulting film had a bubbly surface.

This example demonstrates the fact that the adhesion resistance of polycaprolactam is enhanced by incorporating a small quantity of a hydrocarbon diisocyanate into the polycaprolactam.

EXAMPLE III

The procedure of Example I was repeated except that octadecyl isocyanate, $CH_3(CH_2)_{17}NCO$, was substituted for the *ddi* hydrocarbon diisocyanate.

Test articles prepared from the above composition in the same manner as the Example I test articles exhibited a tendency to stick to the mold.

This Example demonstrates that octadecyl isocyanate is not as good a mold release agent as the 36-hydrocarbon diisocyanate of Example I.

Although the invention is described with particular reference to specific examples, it is understood that the scope of the invention is not limited thereto and that variations not inconsistent with the disclosure are contemplated. For example, as previously noted, the invention can be practiced with nylon materials other than polycaprolactam without departing from the spirit of the invention. The scope of the invention is limited only by the breadth of the appended claims.

I claim:

1. A nylon composition comprised of about 0.01 to 5.0 parts per hundred parts of nylon of a hydrocarbon diisocyanate selected from the group consisting of saturated aliphatic hydrocarbon diisocyanates and alicyclic hydrocarbon diisocyanates and mixtures of these, the hydrocarbon portion of said hydrocarbon diisocyanate containing about 25 to 50 carbon atoms.

2. The composition of claim 1 wherein said hydrocarbon diisocyanate is present in an amount of 0.10 to 2.0 parts per 100 parts of nylon.

3. The composition of claim 2 wherein the hydrocarbon portion of said hydrocarbon diisocyanate contains about 30 to 50 carbon atoms.

4. The composition of claim 3 wherein said nylon is polycaprolactam.

5. A nylon composition having improved adhesion resistance comprised of 0.01 to 5.0 percent based on the weight of nylon in the composition of a hydrocarbon diisocyanate having the structure

$$O = C = N[R]N = C = O =$$

where R is a hydrocarbon radical having 30 to 50 carbon atoms.

6. The composition of claim 5 wherein R is a hydrocarbon radical containing 36 carbon atoms.

7. The composition of claim 6 wherein said nylon is polycaprolactam.

* * * * *